United States Patent
Hermerding, II

(10) Patent No.: US 7,275,012 B2
(45) Date of Patent: Sep. 25, 2007

(54) AUTOMATED METHOD AND APPARATUS FOR PROCESSOR THERMAL VALIDATION

(75) Inventor: James G. Hermerding, II, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 820 days.

(21) Appl. No.: 10/334,233

(22) Filed: Dec. 30, 2002

(65) Prior Publication Data

US 2004/0128101 A1    Jul. 1, 2004

(51) Int. Cl.
G01K 17/00    (2006.01)
G01K 7/10    (2006.01)
(52) U.S. Cl. .............. 702/136; 340/584; 361/687; 374/178; 713/300; 702/132
(58) Field of Classification Search ......... 702/130, 702/132, 136, 188; 62/3.2, 178, 259.2; 374/178, 374/141; 713/100, 323, 321, 300, 340, 320; 361/704, 690; 324/760; 700/293
See application file for complete search history.

(56) References Cited

U.S. PATENT DOCUMENTS

| | | | |
|---|---|---|---|
| H562 H | * | 12/1988 | Trachier et al. ............ 702/133 |
| 5,502,838 A | | 3/1996 | Kikinis |
| 5,706,668 A | | 1/1998 | Hilpert |
| 5,719,800 A | * | 2/1998 | Mittal et al. ............ 713/321 |
| 5,768,104 A | | 6/1998 | Salmonson et al. |
| 5,913,068 A | | 6/1999 | Matoba |
| 5,921,087 A | | 7/1999 | Bhatia et al. |
| 6,000,036 A | | 12/1999 | Durham et al. |
| 6,091,255 A | | 7/2000 | Godfrey |
| 6,157,538 A | | 12/2000 | Ali et al. |

(Continued)

FOREIGN PATENT DOCUMENTS

WO    WO95/25296 A1    9/1995

OTHER PUBLICATIONS

Thermal resistance. Hargrave's Communications Dictionary, Wiley (2001). Retrieved May 16, 2006, from xreferplus. http://www.xreferplus.com/entry/2726227.*

(Continued)

*Primary Examiner*—John Barlow
*Assistant Examiner*—John H. Le
(74) *Attorney, Agent, or Firm*—Blakely, Sokoloff, Taylor & Zafman LLP

(57) ABSTRACT

A method and corresponding software for automatically validating a computer platform thermal solution. An application program is employed to selectively execute thermal stress code to cause the platform's processor to dissipate an amount of power corresponding to a predetermined value, such as a thermal design power dissipation value specified by the processor's manufacturer. In one embodiment, tests are performed while operating at this power dissipation level to determine if a thermal overload condition exists, which may be determined by the processor's temperature, an indication that the processor is throttled, or a signal provided by the processor indicating the processor has detected a thermal overload condition. In another embodiment, a thermal resistance value is calculated based on the processor power dissipation, the temperature of the processor, and the ambient temperature of the test environment. In one embodiment the entire validation process is automatically performed by the application program without requiring any extraneous test equipment or temperature probes.

27 Claims, 7 Drawing Sheets

U.S. PATENT DOCUMENTS

| | | | |
|---|---|---|---|
| 6,167,947 | B1 | 1/2001 | Hokanson et al. |
| 6,172,611 | B1* | 1/2001 | Hussain et al. ............. 340/584 |
| 6,246,969 | B1 | 6/2001 | Sinclair et al. |
| 6,378,027 | B1 | 4/2002 | Bealkowski et al. |
| 6,415,388 | B1* | 7/2002 | Browning et al. .......... 702/132 |
| 6,493,223 | B1 | 12/2002 | Viswanath et al. |
| 6,535,798 | B1 | 3/2003 | Bhatia et al. |
| 6,789,037 | B2* | 9/2004 | Gunther et al. ............. 702/132 |
| 6,804,632 | B2 | 10/2004 | Orenstien et al. |
| 6,908,227 | B2* | 6/2005 | Rusu et al. ................. 374/141 |
| 6,909,922 | B2* | 6/2005 | Tymchenko ................ 702/182 |
| 6,931,559 | B2* | 8/2005 | Burns et al. ................ 713/340 |
| 2001/0021217 | A1* | 9/2001 | Gunther et al. ............. 374/178 |
| 2002/0087901 | A1 | 7/2002 | Cooper et al. |
| 2002/0087903 | A1 | 7/2002 | Hermerding et al. |
| 2002/0143488 | A1* | 10/2002 | Cooper et al. .............. 702/132 |
| 2003/0109967 | A1 | 6/2003 | Cooper |
| 2003/0115013 | A1* | 6/2003 | Dendinger ................. 702/132 |
| 2003/0120960 | A1 | 6/2003 | Cooper |
| 2003/0159938 | A1 | 8/2003 | Hradil |
| 2004/0128101 | A1 | 7/2004 | Hermerding |
| 2005/0172650 | A1 | 8/2005 | Hermerding |
| 2005/0288886 | A1 | 12/2005 | Therien et al. |
| 2006/0064999 | A1 | 3/2006 | Hermerding et al. |
| 2006/0149974 | A1 | 7/2006 | Rotem et al. |

OTHER PUBLICATIONS

U.S. Appl. No. 11/097,428, filed Mar. 31, 2005, Kardach et al.
U.S. Appl. No. 11/173,993, filed Jun. 30, 2005, Karr et al.
U.S. Appl. No. 11/474,023, filed Jun. 23, 2006, Rodarte et al.
"Low Voltage Intel® Pentium® III Processor 512K", Thermal Design Guide, Sep. 2002, pp. 1-20.
Pollard, Lloyd L., et al.: "Thermal Analysis and Validation of MCMs," Sixteenth IEEE Semi-Therm Symposium, pp. 140-146, 2000.

* cited by examiner

Power Consumption vs. Statistical Application Distribution

Statistical CPU Power Consumption Distribution: CPU Under TDP Stress Load

AUTOMATED METHOD AND APPARATUS FOR PROCESSOR THERMAL VALIDATION

FIELD OF THE INVENTION

The field of invention relates generally to thermal validation of integrated circuits and, more specifically but not exclusively relates to a method and apparatus for automatically performing thermal validation of microprocessors.

BACKGROUND INFORMATION

Excess heat is one of the primary causes of failure for microprocessors. Generally, the life of a microprocessor is a function of the thermal load applied during its use. Excessive heat results in internal breakdown of the processor circuits, eventually resulting in failure. With the introduction of processors with sub-micron circuit elements, ever-increasing transistor count (e.g., 42 million transistors for an Intel Pentium 4™ processor) and operating speed, the problem of preventing processor failure due to excess heat is exacerbated.

The objective of thermal management is to ensure that the temperature of all components in a system are maintained with their functional temperature range. Within this temperature range, a component, and in particular its electrical circuits, is expected to meet its specified performance. Operation outside of the functional temperature range can degrade system performance, cause logic errors, or cause component and/or system damage. Temperature exceeding the maximum operating limit of a component may result in irreversible changes in the operating characteristics of the component.

A common way to verify a thermal solution for a particular platform/processor begins with thermal design parameters for the processor type. Generally, a processor produces a baseline amount of heat by simply being powered (i.e., when in a sleeping state), and a variable amount of heat that is a function of the processing load encountered during operation. Other factors include the operating frequency, and structural parameters, such as circuit line width and density. Notably, different processors of the same design may exhibit significantly different thermal characteristics. In order to ensure processor longevity, the processor manufacture publishes various thermal design parameters that are derived from an extensive statistical-based testing of each processor type. For example, thermal design parameters such an overall minimum heat transfer coefficient, maximum temperature, and thermal design power ratings are specified by the manufacturer for a particular processor model.

Based (generally, at least in part) on these thermal design parameters, Engineers for system integrators (e.g., a original equipment manufacturer such as Hewlett-Packard, Dell, Compaq, IBM, Toshiba, Gateway, etc.) use these thermal design parameters to verify that their platform's thermal solution will provide sufficient cooling to ensure processor longevity. While this is generally not as much of an issue for desktop computer systems, which typically provide thermal solutions having large cooling margins, such large cooling margins are not realizable for laptop and notebook computers. Accordingly, it is generally necessary to verify the thermal design via testing, preferably using a statistically significant number of test samples to account for the variance in processor power. Under conventional testing techniques, this typically requires the use of various external instrumentation and thermal test components, including resistive thermal devices (RTDs) such as thermocouples or thermisters to measure the external processor temperature, electronic test equipment to measure and record the test results, etc. This type of thermal solution verification testing is both expensive and time-consuming.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein like reference numerals refer to like parts throughout the various views unless otherwise specified.

DETAILED DESCRIPTION OF PREFERRED EMBODIMENTS

Embodiments of methods and apparatus for automatically performing processor thermal validation are described herein. In the following description, numerous specific details are set forth to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In a system environment, the processor temperature is a function of both system and component thermal characteristics. The system level thermal constraints consist of the local ambient air temperature and airflow over the processor as well as physical constraints at and above the processor. The processor temperature depends in particular on the component power dissipation, the processor package thermal characteristics, and the processor thermal cooling solution.

For many years, thermal cooling solutions were designed to ensure that a processor never reached a maximum operating temperature. In essence, they were designed for the worst-case scenario. These were typically calculated based on a maximum processor power consumption, which directly relates to the amount of heat that needed to be dissipated by the processor (and thus the processor's temperature). As a result, excess cooling margins were often provided, resulting in higher cooling system costs, and greater audible disturbances (e.g., fan noise).

Recently, processors have been developed that include built-in thermal management features. For example, the Intel Pentium 4™ processor includes a Thermal Monitor that is integrated into the processor silicon. The Thermal Monitor includes a highly accurate on-die temperature sensing circuit, a signal (PROCHOT#) that indicates the processor has reached its maximum operating temperature, registers to determine status, and a thermal control circuit that can reduce the processor temperature by controlling the duty cycle of the processor clocks.

Figure 1:
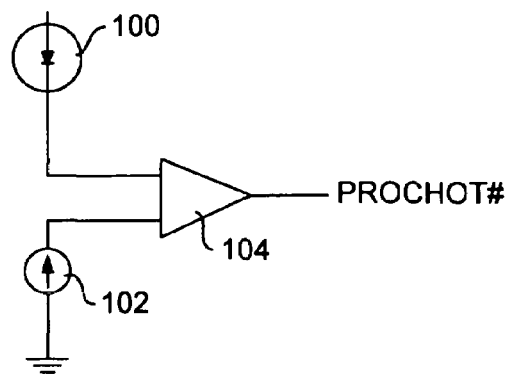
FIG. 1 is a schematic diagram illustrating a portion of a thermal control circuit contain on a processor that may be employed in computer platforms for which thermal validation testing may be performed in accordance with embodiments of the invention.

The processor temperature is determined through an analog thermal sensor circuit comprising a temperature sensing diode 100, a factory calibrated reference current source 102, and a current comparator 104, as shown in FIG. 1. A voltage applied across the diode will induce a current flow that varies with temperature. By comparing this current with the reference current, the processor temperature can be determined. The reference current source corresponds to the diode current when at the maximum permissible processor operating temperature.

The Thermal Monitor's thermal control circuit (TCC), when active, lowers the processor temperature by reducing the duty cycle of the internal processor clocks. Typically, the TCC portion of the Thermal Monitor is enabled via the system BIOS. When active, the TCC turns the processor clocks off and then back on with a predetermined duty cycle. In one embodiment, an ACPI (Advanced Configuration Power Interface) register, performance counter registers, status bits in model specific register (MSR), and the PROCHOT# output pin are available to monitor and control the Thermal Monitor.

Figure 2:
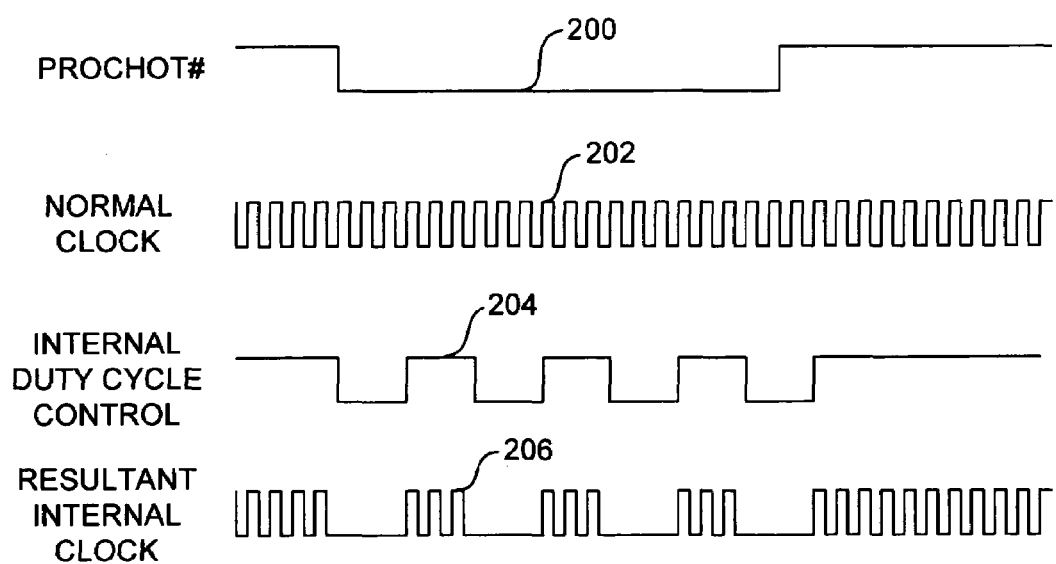
FIG. 2 is a schematic diagram illustrating a processor throttling scheme corresponding to a condition in which a thermal overload condition has been detected.

An exemplary processor clock-throttling scheme is shown in FIG. 2. Under normal operations, the processor clock would cycle as shown by normal clock waveform 202. However, in response to an asserted (low) PROCHOT# signal 200, an internal clock duty cycle control signal begins to be switched on and off, as shown by waveform 204. The resultant internal clock cycle is shown in waveform 206. The actual duty cycle will vary from one product to another. Generally, cycle times will be processor speed dependent and decrease as processor core frequencies increase.

For testing purposes, the thermal control circuit may also be activated by setting bits in the ACPI MSRs. The MSRs may be set based on a particular system event (e.g., an interrupt generated after a system event), or may be set at any time through the operating system or custom driver control, thus forcing the thermal control circuit on. This is referred to an "on-demand" mode. Activating the thermal control circuit may be useful for cooling solution investigations or for performance implication studies.

To minimize the cost of processor thermal solutions, system designers are encouraged to take advantage of the Thermal Monitor feature capability. The Thermal Monitor feature allows processor thermal solutions to design to the thermal design power (TDP) target, as opposed to a maximum processor power dissipation level. Designing to the lower TDP target results in a lower thermal solution cost, while still maintaining a level of processor performance that is virtually indistinguishable from systems designed to manage maximum power dissipation levels.

Figure 3:
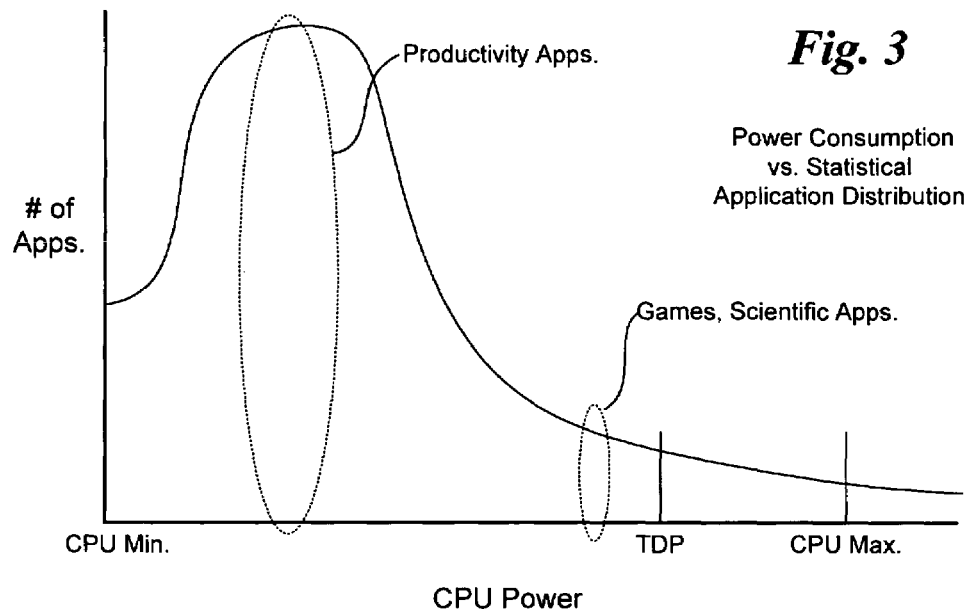
FIG. 3 is a diagram illustrating a statistical distribution of applications vs. a relative amount of power a processor dissipates when executing the applications.

Generally, the TDP target is determined as a function of the anticipated thermal stress load the processor will encounter, which in turn is a function of the application software run on the processor. For example, FIG. 3 shows a graph of CPU power vs. number of applications, which is illustrative of a typical power consumption vs. application type distribution. Generally, each application program has its own unique power profile, although the profile has some variability due to loop decisions, I/O activity and interrupts. The graph illustrates a statistical distribution based on averaged application power consumption.

In general, compute intensive application with a high cache hit rate dissipate more processor power than applications that are I/O intensive or have low cache hit rates. This effect is depicted in the graph, wherein the thermal stress (i.e., CPU power) resulting from most applications, such a productivity applications, is moderately low when compared with computer intensity applications, such as games and scientific applications.

Typically, the processor TDP is based on measurements of processor power consumption while running various high power applications. This data is used to determine those applications that are interesting from a power perspective. These applications are then evaluated in a controlled thermal environment to determine their sensitivity to activation of the thermal control circuit. This data is used to derive the TDP targets published in the processor datasheet.

A system designed to meet such published TDP targets greatly reduces the probability of real application causing the thermal control circuit to activate under normal operating conditions. Systems that do not meet these specifications could be subject to frequent activation of the thermal control circuit depending on ambient air temperature and application power profile. Moreover, if a system is significantly under-designed, there is a risk that the Thermal Monitor feature will not be capable of maintaining a safe operation temperature and the processor could shutdown and signal a thermal trip point condition.

In accordance with aspects of the invention, a thermal solution may be validated by verifying the case-to-ambient thermal resistance, $\theta_{CA}$, as specified by the following equation:

$$\theta_{CA}=(T_C-T_A)/\text{Power dissipated from case to ambient} \qquad (1)$$

where $T_C$ is the case temperature of the processor, and $T_A$ is the ambient temperature. In one embodiment, thermal solution validation is verified by comparing a measured $\theta_{CA}$ a case-to-ambient thermal characterization parameter $\Psi_{CA}$ specified for the processor, where $$\Psi_{CA}=(T_C-T_A)/\text{Total Package Power} \quad (2)$$

In one embodiment, the Total Package Power is the TDP target value. Generally, if the measured $\theta_{CA}$ is less than the specified $\Psi_{CA}$, the thermal cooling solution is validated.

Figure 4:
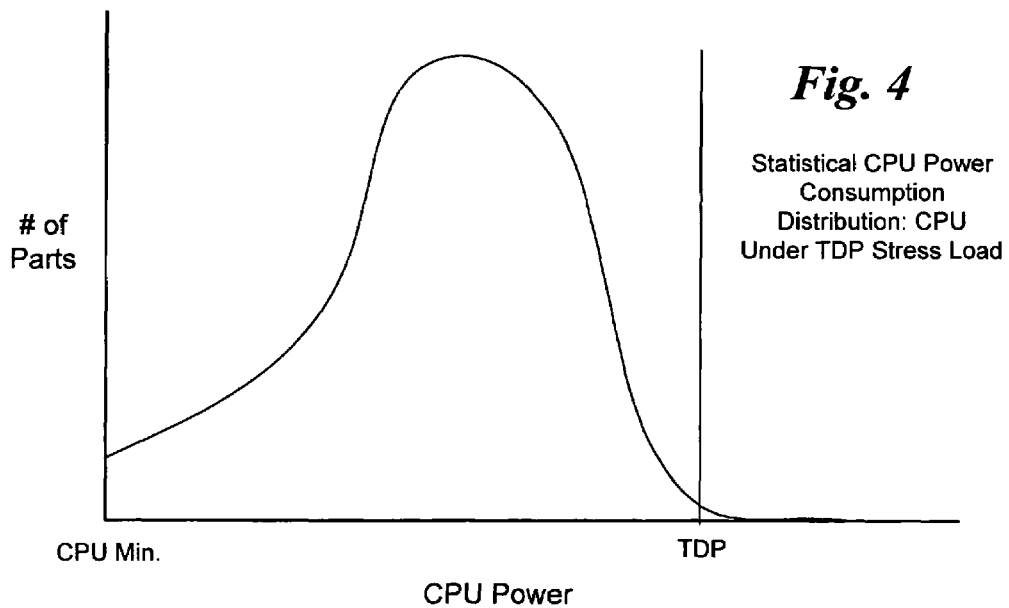
FIG. 4 is a diagram illustrating a statistical distribution of power dissipated by processors corresponding a common type of processor when executing a common set of thermal stress code instructions designed to produce a predetermined level of processor power dissipation.

Ideally, $\theta_{CA}$ could be determined in the following manner. Execute TDP thermal "stress" code comprising various instructions and operations designed to produce a thermal load (stress) on the processor corresponding to a TDP power dissipation condition, and simply measure the case and ambient temperature. A problem with this approach results from the fact that due to manufacturing variances, all processors do not consume the same amount of power under the same thermal stress load. For example, an exemplary statistical distribution of actual processor power consumption under a common TDP thermal stress load (e.g., through execution of TDP thermal stress code) is shown in FIG. 4. As a result, the value for $\theta_{CA}$ would be dependent on the particular processor or processors that is/are tested. Another way to look at the implication of the FIG. 4 graph is that there is no single set of thermal stress code instructions that would induce a TDP power dissipation condition in all processors.

In accordance with further aspects of the invention, a more accurate result for $\theta_{CA}$ is obtained by measuring the temperature of the processor under a processor-independent TDP thermal stress level to produce a TDP power dissipation level. Furthermore, in accordance with one embodiment of the invention, the entire process is done through software. In accordance with another embodiment, the entire process is performed without requiring any extraneous thermal probes or power measurement probe components.

Figure 5A:
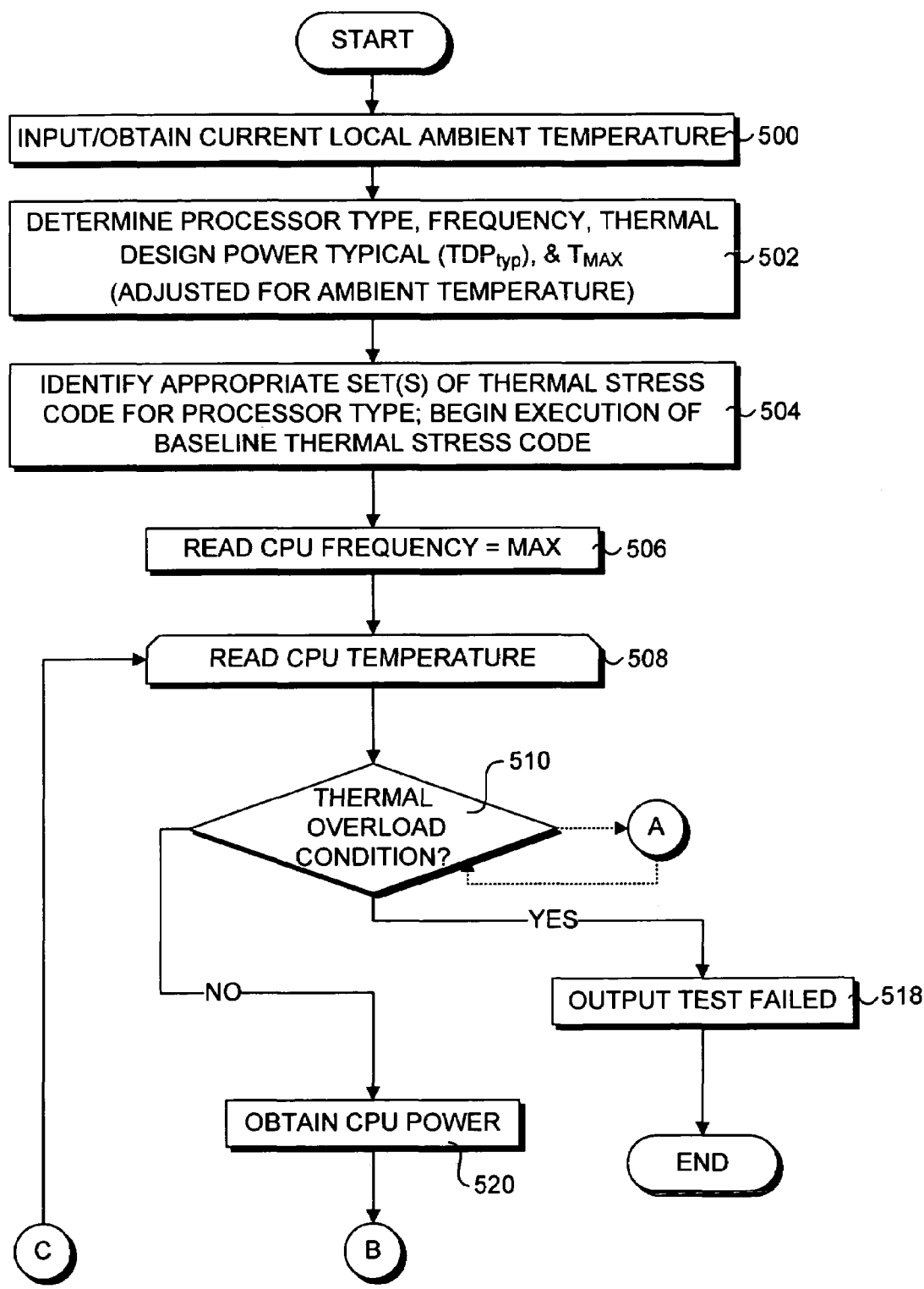
FIGS. 5A–5C collectively comprise a flowchart illustrating logic and operations performed by an application program that is used to validate a platform thermal solution in accordance with one embodiment of the invention.
Figure 5B:
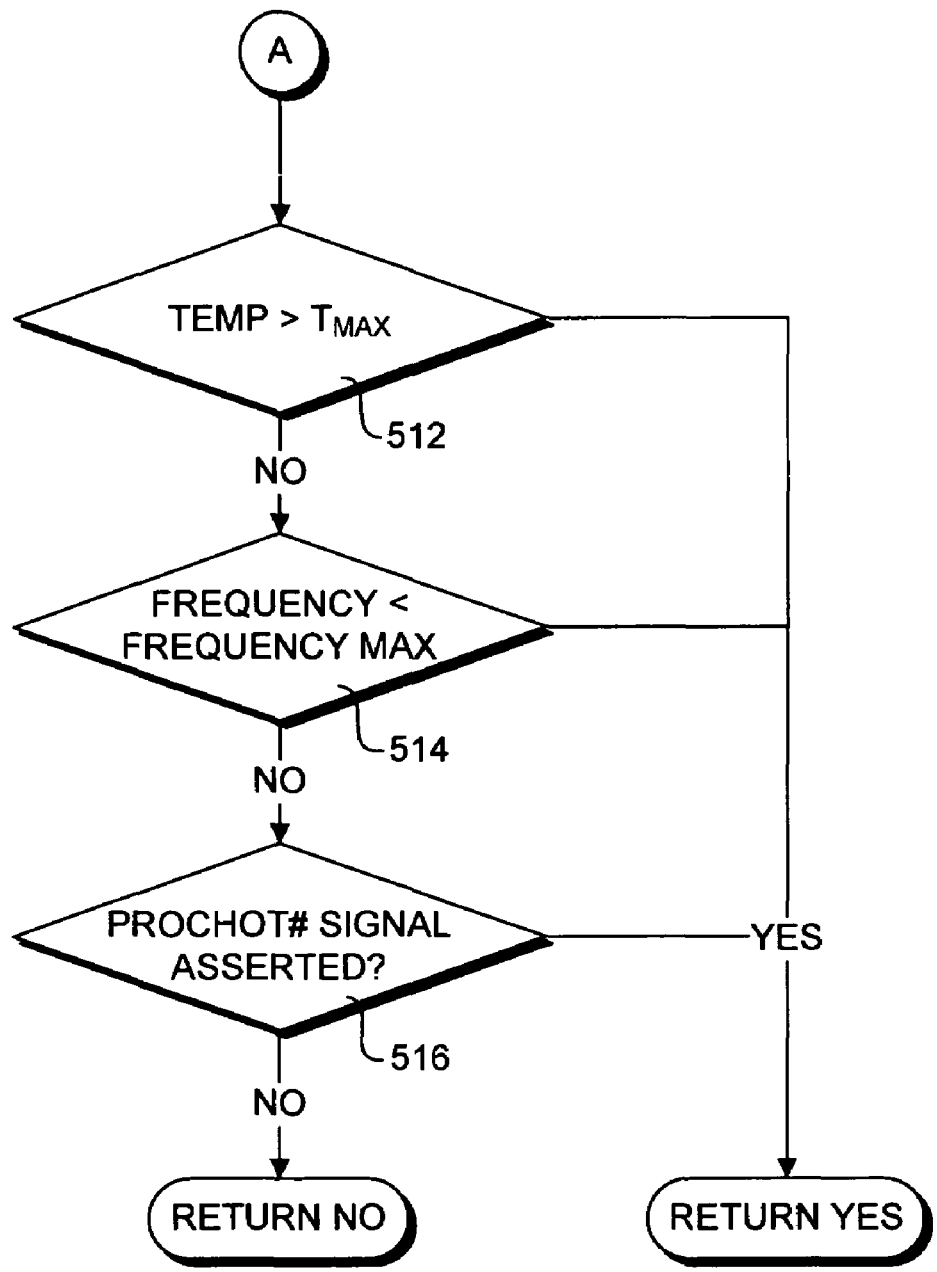
Figure 5C:
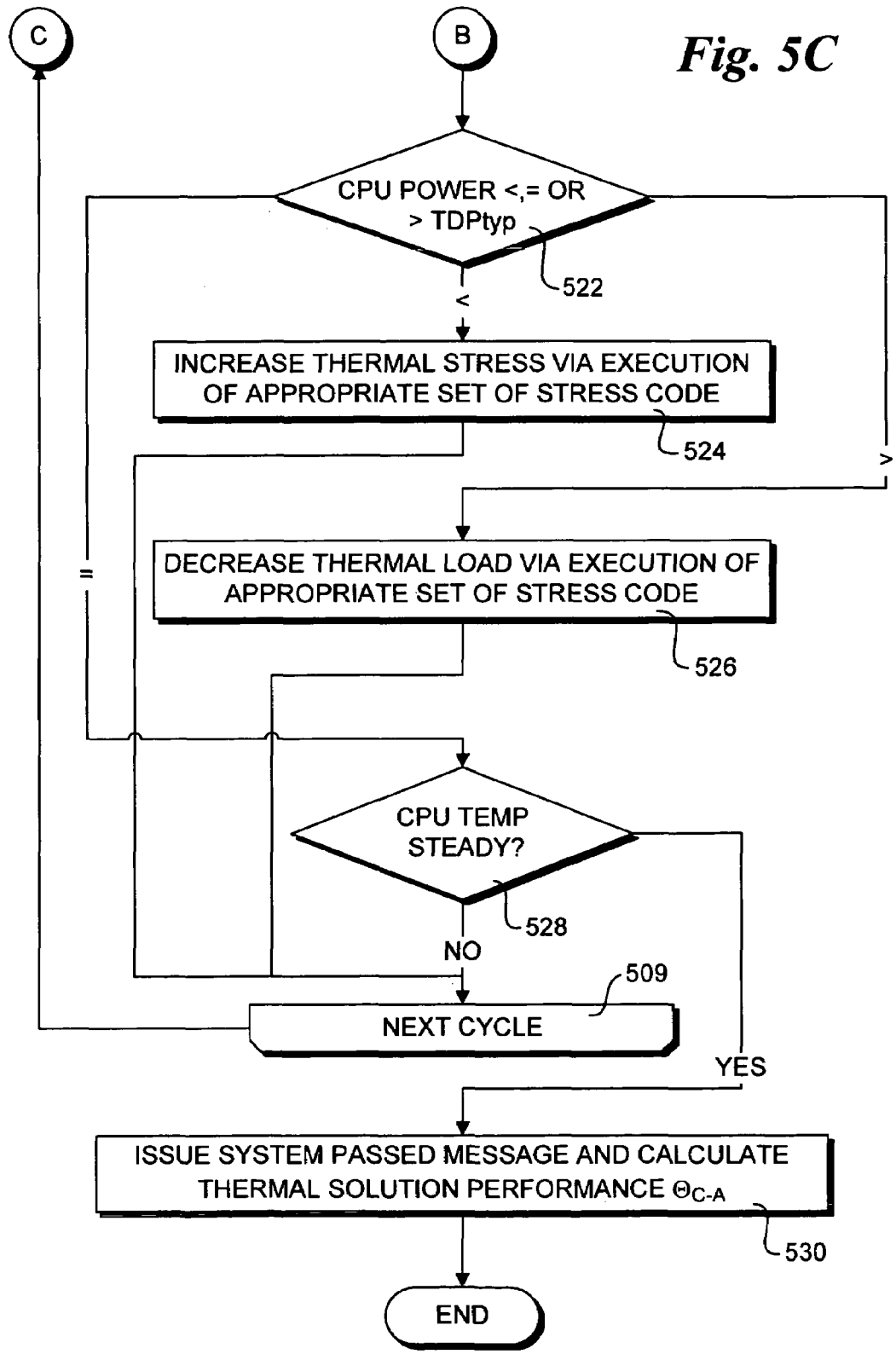

With reference to the flowchart of FIGS. 5A-5C, a process for performing a software-only platform thermal solution validation in accordance with one embodiment of the invention begins in a block 500 in which the current ambient temperature is obtained. In one embodiment, the ambient temperature is input by test personnel via a user interface provided by a software application that is executed on a processor to perform thermal solution validation testing in accordance with the flowchart. In another embodiment, an ambient temperature value may be retrieved from a temperature measurement device that includes a communications interface that is connected to the computer platform via a standard communications cable, such as a serial or USB cable, and received over a corresponding input/output (I/O) port.

Next, in a block 502, the processor type, normal operational frequency, and thermal design power typical (TDP$_{typ}$) are determined, with the latter parameter adjusted for the ambient temperature. Typically, the processor type and frequency can be obtained through a call to the operating system. In another embodiment, such information may be obtained through retrieving corresponding data from processor registers, such as MSRs. In a third embodiment, such information may be manually entered by test personnel. Once the processor type and frequency are determined, the TDP$_{typ}$ value is retrieved from a lookup table that maps processor types and frequencies with their corresponding TDP$_{typ}$ values. The lookup table may include entries for various ambient temperatures, or an adjustment factor may be applied to adjust a manufacturer TDP$_{typ}$ value (typically rated at 35° C.) to corresponds to an equivalent TDP$_{typ}$ value for the ambient conditions. In one embodiment, the processor type and frequency to be tested are known in advance, and therefore such information does not need to be determined at run-time as provided by block 502. In addition to the foregoing values, in one embodiment the maximum temperature for the processor, $T_{max}$, is also retrieved.

After the processor type, frequency, and TDP$_{typ}$ values are known, an appropriate set or sets of thermal stress code instructions is identified, and a baseline set of thermal stress code begins execution on the processor under test in a block 504. As discussed above, thermal stress code comprises instructions and operations designed to induce a thermal load (i.e., thermal stress) on the processor. The terminology "sets of thermal stress code instructions" is indicative that in one embodiment multiple instruction/operation sets are employed during testing to adjust the thermal stress on the processor, as described below. Generally, it may be advantageous to create sets of thermal stress code instructions that are particular to a corresponding processor and/or processor/frequency combination; however, this is not required. Accordingly, in one embodiment processor-specific sets of thermal stress code are employed, while in another embodiment a "generic" set or sets of stress code is employed. Following initiation of the execution of the thermal test code, the processor operating frequency is read in a block 506 to verify it is running at its designed frequency.

The remaining operations pertain to run-time testing, which are selectively performed based on the result of various conditionals and loop logic defined by the flowchart. The primary loop, which is defined by start and end loop blocks 508 and 509, begins by reading the processor temperature. In accordance with one embodiment, the processor temperature is provided internally by the processor, in a manner similar to that discussed above, and the temperature value is stored in a platform storage location, such as a register or memory location. In one embodiment, the temperature can be retrieved from the register using an ACPI-compliant operating system call. In another embodiment, the temperature value is accessed via direct access to the register (i.e., accessed directly by the testing application, without employing the OS). Both techniques are known in the art, and will generally be processor type and/or OS-type dependent.

Next, in a decision block 510 a determination is made to whether a thermal overload condition currently exists or was tripped. Details for determining the result of this decision block are shown in FIG. 5C. In general, one or more of the conditional tests shown in FIG. 5C may be implemented to make the determination. These include determining in a decision block 512 whether the processor temperature is greater than $T_{max}$. Another indication to whether a thermal overload condition exists or was tripped is to monitor the processor frequency. If a thermal overload condition is tripped, the processor's built-in logic (e.g., via the thermal control circuit) may "throttle" the processor by reducing its frequency. For example, built-in circuitry such as the foregoing Thermal Monitor may be used to sense a thermal overload condition, and throttle the processors execution speed via lowering the effective processor frequency. In some instances, this throttling is effectuated via the duty-cycle scheme of FIG. 2. In other cases, the processor frequency may be reduced while maintaining a constant duty cycle (e.g., through a frequency divider network or component). In either situation, various known techniques may be employed to determine the effective processor frequency. This frequency test is depicted by a decision block 514.

As discussed above, Intel Pentium 4 processors assert a PROCHOT# signal when a thermal overload condition is detected while the Thermal Monitor is enabled. Accordingly, as depicted by a decision block 516, a determination can be made to whether the PROCHOT# signal is asserted. If any of the determinations corresponding to decision blocks 512, 514, and 516 are YES (TRUE), the thermal solution has failed, and a corresponding output is provided to the test operator and/or recorded in a block 518, whereupon the test is terminated.

If the operations of FIG. 5B return a NO (FALSE) result, the logic proceeds to a block 520 in which the current processor power consumption is obtained. As described below in further detail, in one embodiment a voltage regulator with built-in power measurement capabilities and corresponding conversion circuitry is employed to provide power to the processor. Accordingly, in this embodiment the processor power can be obtained by reading an appropriate register or storage location in which a value indicative of the current processor power consumption is stored. In another embodiment, the overall power consumption of the platform is measured via an external measurement, as described below. The processor portion of this overall total is then derived to obtain the current processor power consumption.

Figure 8:
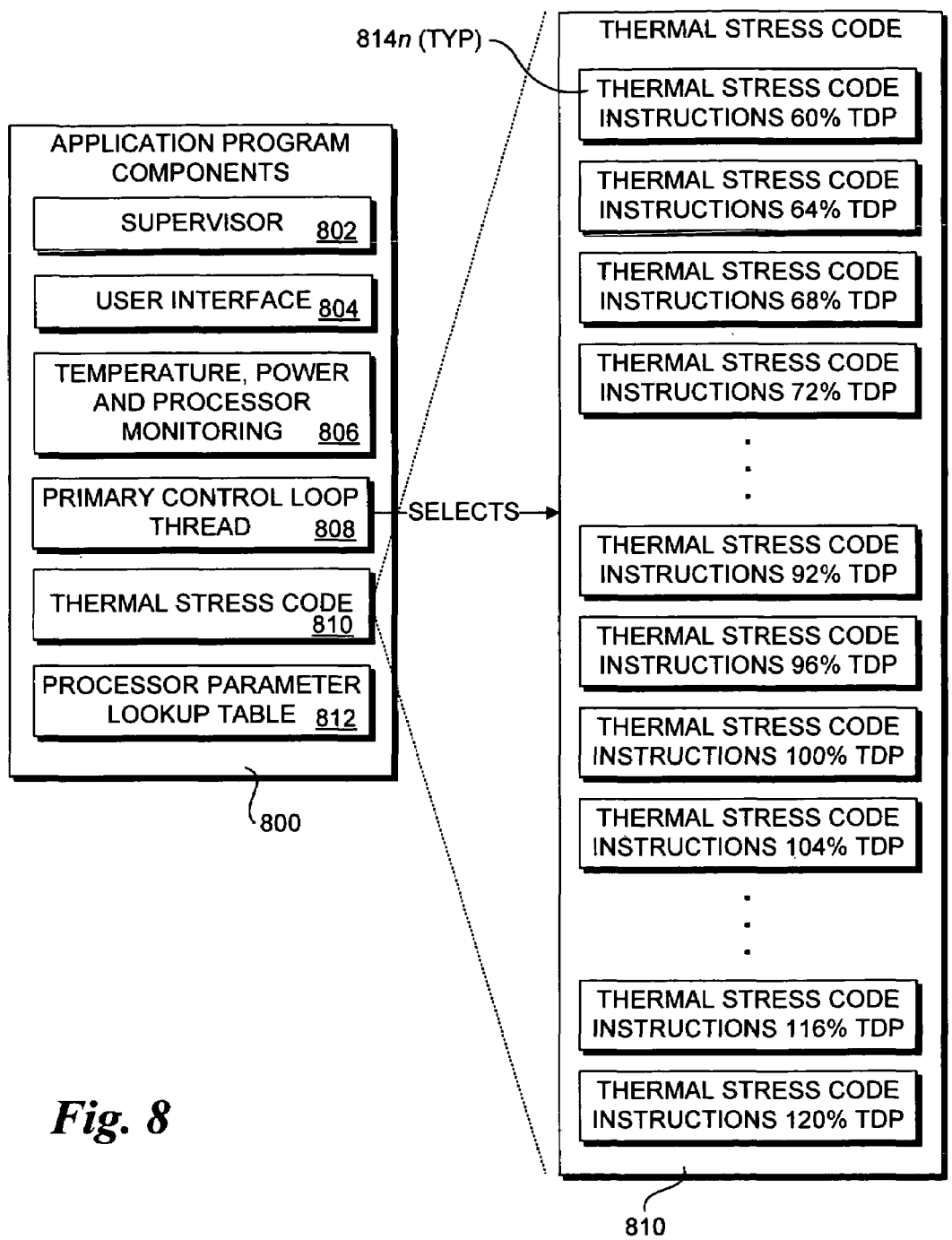
FIG. 8 is a schematic diagram illustrating a software architecture for an application program and corresponding thermal stress code that may be executed on a processor to validate a platform's thermal solution in accordance with one embodiment of the invention.

Moving forward to the portion of the flowchart at the top of FIG. 5C, the next set of operations pertain to adjusting the thermal stress load (i.e., power dissipation) of the processor such that it is maintained at or near $TDP_{typ}$. In one embodiment, this is enabled through appropriate logic built into the stress code or other test application component in accordance with the following logic. In a block 522, a determination is made to whether the current processor consumption is less than, equal to, or greater than $TDP_{typ}$. If the processor power is less than $TDP_{typ}$, the thermal stress is too low, and thus the thermal stress is increased via selective execution of new set of stress code instructions that produce a higher thermal stress when executed. For example, in one embodiment, the thermal stress code comprises a plurality of sets of thermal stress code instructions (i.e., sets of respective instructions, operations, and branching logic, etc.), wherein each respective set of thermal stress code instructions produces a different level of power consumption, on a relative (non-absolute) basis, as illustrated in FIG. 8 and discussed in further detail below. At the same time, the identity of the set of thermal stress code currently executing is monitored. If the thermal stress is to be increased, the set of thermal stress code that produces the next highest level of power consumption begins to execute in place of the previously executing set of thermal stress code, becoming the new current set of thermal stress code , as depicted by a block 524.

In converse to the under-stressed condition, if the processor power level is greater than $TDP_{typ}$, the processor is thermally overstressed, and its power consumption should be reduced. Thus, the set of thermal stress code instructions that produces the next lower level of power dissipation begins to execute, becoming the new current set, as depicted by a block 526. Finally, if the current processor power level is already at $TDP_{typ}$, there is no need to change the current set of thermal stress code, and thus the current set of code remains being executed.

After the determination is made to which set of thermal stress code should be executing, a determination is made in a decision block 528 to whether the processor temperature is steady. Basically, the objective is provide a processor thermal stress via the selective execution of the sets of stress code such that the processor reaches as steady-state temperature in conjunction with the processor power dissipation substantially matching $TDP_{typ}$. In one embodiment, once this combination of conditions exists, the value for $\theta_{CA}$ can be calculated at the target TDP value. In another embodiment, if the processor can operate at $TDP_{typ}$ without inducing a thermal overload, the thermal solution is validated. The $\theta_{CA}$ calculation, if employed, along with the issuance of a system passed message and/or recording is performed in a block 530, completing the test. As provided by end loop block 509, in the event the steady-state condition hasn't been reached, the process loops back up to repeat the foregoing operations defined between start loop block 508 and the end loop block. This process loop is continued until either a test failure occurs, or a steady-state temperature at a $TDP_{typ}$ power consumption level is obtained without inducing a thermal overload, which may also be used to indicate a test success.

As discussed above, in one embodiment the thermal solution validation process is handled entirely by software. This is enabled, in part, by using a built-in (to the platform) means for measuring the processor power consumption. Such a power measurement means provides a power measurement output value that may be stored in a register or other platform storage location and accessed by the thermal solution validation test software, thereby providing an accurate measurement of the current processor power consumption.

Figure 6:
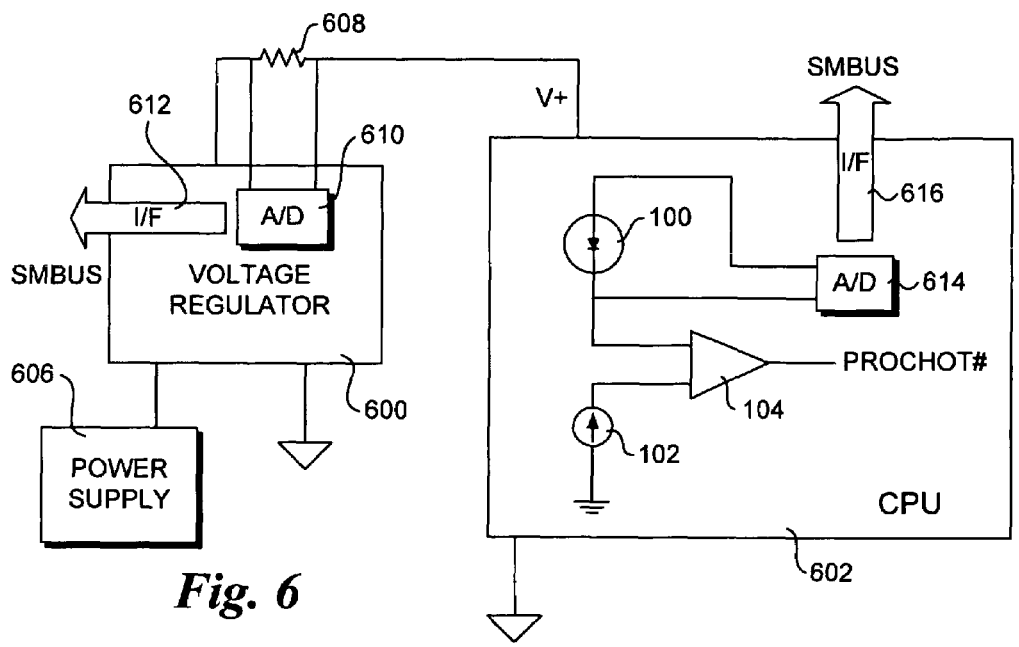
FIG. 6 is a is schematic diagram illustrating details of a voltage regulator that includes a built-in power measurement feature and illustrating further details of the thermal control circuit of FIG. 1.

With reference to FIG. 6, in one embodiment a power measurement means is implemented via a voltage regulator 600 that supplies power to a processor 602. Oftentimes, voltage regulators and the like, which provide separate power outputs relative to a systems main power supply, are employed to ensure that the power provided to critical circuits such as processors is very accurate, with a minimum amount of noise. Typically, the voltage regulator receives input power from the platforms power supply, as depicted by a power supply 606.

Voltage regulator 600 provides a regulated predetermined fixed voltage V+ to CPU 602. For example, V+ may typically comprise 3.1-3.3 volts for modern microprocessors, although voltages in the general range of 2.2-5.0 volts are also common, depending on the processor's circuit composition. Once the voltage is known, the amount of power consumed by processor 602 can be determined by measuring the current flow into the processor.

There are many well known schemes for determining current flowing through a wire. For example, in one embodiment a current sense resistor 608 is employed to sense the current supplied to processor 602. The voltage drop across the sense resistor is measured by an analog-to-digital (A/D) converter 610. The amount of current flowing through the resistor, and thus being supplied to the processor, can then easily be obtained by known the resistance of the resistor. A value corresponding to the input current, or optionally input power (determined current times V+), is then provided to a system management bus (SMBUS), via and interface (I/F) 612. The SMBUS is used for passing various system management-related information among system management components. It may also be used to store system management data, such as the processor input current or input power in various registers, or in a special portion of a platform's RAM known as SMRAM. Thus, the processor input current and/or power can be measured and stored in a periodic basis, and retrieved from a storage location by the thermal solution validation software to determine the current power consumption of the processor.

Additional details of the thermal management features are also shown in FIG. 6. These include a means for measuring the processor temperature, and means for providing the measured temperature to external components. In one embodiment, the means for measuring the processor temperature comprises an A/D converter 614, which is connected so as to measure the voltage differential across temperature sensing diode 100. The output of the A/D converter is then made available to other system components coupled to the SMBUS via an interface 616.

Generally, in order to implement the scheme of FIG. 6, an appropriately configured voltage regulator and interface circuitry must already exist for the particular platform being tested. In many instances, this will not be available. As a result, an alternate means must be provided for determining the processor power dissipation.

Figure 7:
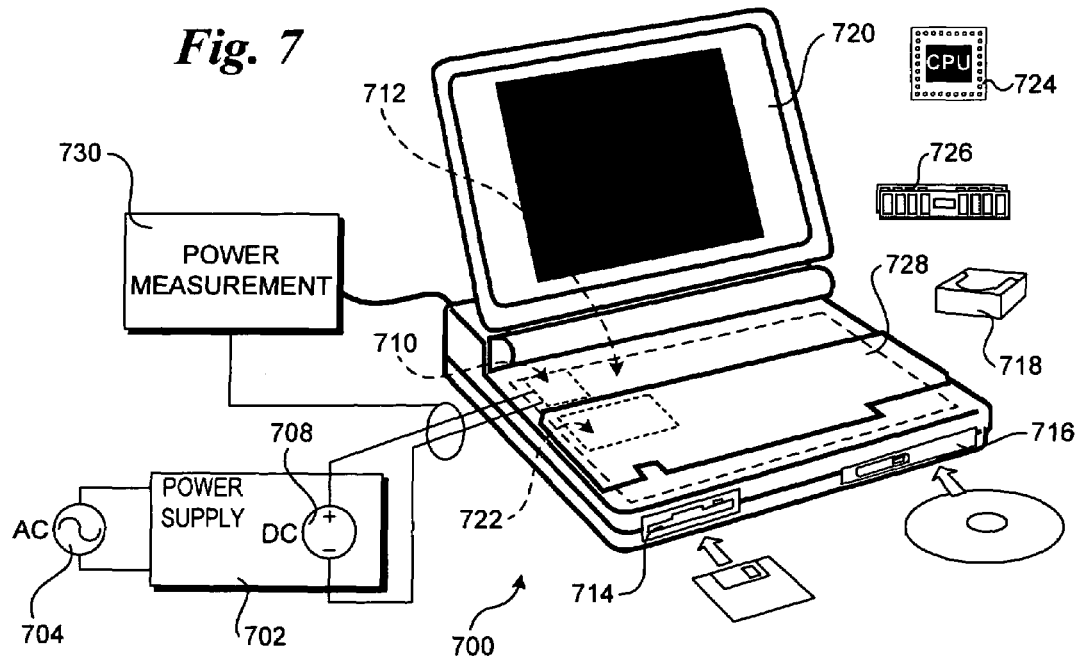
FIG. 7 is a schematic diagram of a laptop computer illustrative of computer platforms having thermal solutions that may be validated via embodiments of the invention, and details of one embodiment in which a current processor power dissipation is determined through measuring the total amount of power consumed by the laptop computer.

One embodiment of such an alternate processor power dissipation measurement means is shown in FIG. 7. In this instance, the amount of power consumed by the platform as a whole is measured, and then the portion of the power consumed by the processor is extracted from the total power consumption measurement. As discussed above, in many instances it is more difficult to design a thermal cooling solution for a laptop or notebook computer, since the airflow around the processor is much more restrictive than most desktop configurations. Furthermore, the use of heatsinks in laptops and notebooks is very limited, so other heat transfer mechanism are employed.

Most of today's laptop computer' employ an external power supply that is connected to an AC power source, such as depicted by a laptop computer 700, power supply 702, and AC power source 704 in FIG. 7. The power supply produces a DC output 708 that is received as input power to the laptop. Typically, the input is received via a power conversion circuit or component 710, which is used to supply power to the laptop's motherboard 712, and other platform components, including peripheral devices such as a floppy drive 714, a CD ROM drive 716, a hard disk 718, and drive circuitry to drive a display 720. Power is also provided to other circuits and components, such as one or more cooling fans, speakers, network interfaces, etc. The power conversion circuitry or component is also typically coupled to a battery 722.

Generally, a processor 724 and one or more memory modules 726 will be connected to motherboard 712. The motherboard will also include a plurality of integrated circuit (IC) components, such as chipset components, communication interface components (e.g., for network interfaces, serial and parallel ports, USB ports, etc), display drive components, keyboard interface component for interacting with a keyboard 728, and other IC's. The motherboard will typically also include various passive components (e.g., resistors, capacitors, etc.).

In accordance with the illustrated embodiment, a power measurement device 730, such as a clamp meter, is used to measure the input power supplied to laptop computer 700. The power measurement device may perform a current measurement, or may directly provide a power measurement. For example, Fluke Corporation of Everett, Wash. manufactures several clamp meters that include voltage inputs, enabling such meters to provide a direct power measurement. In an optional configuration, a custom power supply may be employed that provided built-in power measurement capabilities (not shown). In such an implementation, the power supply should provide substantially the same output voltage and current as the laptop's normal power supply.

The power measurement device provides a power measurement signal (current or input power) that is accessible to laptop computer 700 via a communication interface (not shown), such as a serial interface or a USB interface. Generally, the power measurement device can directly provide such an interface, or it may be coupled to another device that provides the interface. This enables the thermal solution validation software to retrieve the current power consumption of the laptop computer.

As above, the objective is to determine the processor power dissipation on an ongoing basis. In order to obtain this, the amount of power consumed by the processor and the amount of power consumed by other platform components will be derived. Ideally, testing should be performed in a manner that enables as many components as possible to be at rest, such as floppy drive 714, CD ROM drive 716, hard disk 718, etc. The idea is to determine a baseline power consumption level of the platform (particularly the motherboard alone, if possible), and then calculating the power use of the processor based on the change in power consumption during the test. Furthermore, testing should be performed in a manner in which the laptop's fan or fans are operating at a continuous level (e.g., off, at an intermediate level, or maximum level).

Generally, the largest consumers of power on a laptop are the processor, peripheral devices, and the display screen. In contrast, the amount of power consumed by the other components (besides the processor) on the motherboard is typically much smaller. Like the processor, the amount of power consumed by a given motherboard and peripheral devices will vary, primarily due to manufacturing variances of the various motherboard components. This variance will affect the accuracy of the processor power dissipation determination, since the total platform power consumption, which will depend on both the processor and the other platform circuitry and components, is measured rather than the processor power dissipation directly.

Exemplary Software Architecture

An exemplary software architecture diagram in accordance with one embodiment of the invention is shown in FIG. 8. Generally, the software will comprise an application program that includes a plurality of components. The components may be contained within the executable code for the application program, or may comprise separate modules, such as dynamic link libraries, externally callable code segments, etc. For illustrative purposes, a plurality of exemplary components are shown as comprising portions of an application program 800.

Application program 800 includes a supervisor component 802, a user interface 804, a temperature, power, and processor monitoring block 806, a processor thermal control loop block 808, and thermal stress code 810. Generally, each of these components may be implemented as separate threads, multiple components may be combined into a single threads, or multiple threads may be employed for an individual component. In addition, application program 800 includes a lookup table 812 in which processor parameters are stored, such as $T_{max}$, $TDP_{typ}$, etc. Typically a set of processor parameters will be stored for each processor type and/or processor/frequency combination.

In one embodiment, the supervisor component 802 comprises a primary thread that is responsible for controlling the overall operations and interactions with the application program. The user interface 804 is provided to enable test personnel to interact with the application, such as providing various inputs and display test results.

Operations and logic provided by the temperature, power, and processor monitoring block 806, processor thermal control loop block 808, and thermal stress code 810 generally correspond to the operations and logic discussed above with reference to the flowchart of FIGS. 5A-5C. For example, operations provided by temperature, power, and processor monitoring block 806 include retrieving and/or monitoring data pertaining to processor and ambient temperature, processor power dissipation measurements, and thermal overload condition measurements and monitoring operations. Meanwhile, the processor thermal control loop block 808 is responsible for adjusting the processor power dissipation level such that it substantially matches the target level, e.g., TDP. This is accomplished comparing the current measured or determined processor power dissipation level with the target, and then adjusting the thermal stress up or down accordingly based on selective execution of sets of thermal stress code instructions 814$n$. Generally, the sets of thermal stress code instructions are designed to induce a thermal stress on the processor that is proportional to the processor dissipation level target, wherein the sets are arranged to produce incremental changes in the thermal stress. For example, in the illustrated example, the increment is 4% of TDP. Accordingly, process thermal control loop 808 selects a new set of thermal stress code instructions to execute, if necessary based on the logic discussed above with reference to FIG. 5C.

Exemplary Platform on which Embodiments of the Invention may be Implemented

Returning to FIG. 7, laptop computer 700 is further generally illustrative of various platforms that can be tested using embodiments of the thermal solution validation software scheme disclosed herein. For example, a typical platform will include a motherboard having a processor, memory, chipset components, and other IC, which is disposed in a chassis. Generally, the chassis may comprise a laptop case, or may comprise a desktop or server case. The platform will also include peripheral devices, such as floppy drives, CD ROM drives, hard disks, etc., which are usually internally housed in the chassis.

The software comprising the thermal solution validation test application (and optional supporting modules) will typically be loaded via a floppy drive or CD ROM and stored on a hard disk or other persistent storage device in the platform. Optionally, the test code may be loaded at run-time from a floppy disk or a CD ROM. As yet another optional loading mechanism, the software may be downloaded over a network.

The software application code, which will typically comprise a plurality of instructions and data, will be executed on the platform processor during the test. Generally, the instructions may comprise directly executable machine code, or may comprise instructions corresponding to an intermediate language that is compiled and executed at run-time by an intermediate language engine, such as Java code, C# code, etc.

Thus, embodiments of this invention may be used as or to support a software application executed upon a platform's processor or otherwise implemented or realized upon or within a machine-readable medium. A machine-readable medium includes any mechanism for storing or transmitting information in a form readable by a machine (e.g., a computer). For example, a machine-readable medium can include such as a read only memory (ROM); a random access memory (RAM); a magnetic disk storage media; an optical storage media; and a flash memory device, etc. In addition, a machine-readable medium can include propagated signals such as electrical, optical, acoustical or other form of propagated signals (e.g., carrier waves, infrared signals, digital signals, etc.).

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. An automated method for validating a thermal solution for a computer platform, comprising:
   adjusting, through selective execution of thermal stress code on a platform processor, an amount of power dissipated by the processor to substantially match a target power dissipation level by performing the operations of:
      (a) executing an initial set of thermal stress code instructions;
      (b) determining a current amount of power dissipated by the processor;
      (c) comparing the current amount of power dissipated with the target power dissipation level;
      (d) selecting a new set of thermal stress code instructions to execute based on the result of operation (c), wherein execution of the new set of thermal stress code instructions increases the amount of power dissipated by the processor if the current amount of power dissipated is less than the target dissipation level or decreases the amount of power dissipated by the processor if the current amount of power dissipated is greater than the target dissipation level;
      (e) repeating operations (b)-(d) until a steady-state condition is reached, wherein the current amount of power dissipated by the processor substantially matches the target power dissipation level;
   determining if the processor is thermally overloaded while operating at the target power dissipation level; and
   outputting a thermal solution validation test result, wherein the thermal solution is validated if the processor is not thermally overloaded while operating at the target power dissipation level.

2. The method of claim 1, wherein the current amount of power dissipated by the processor is determined through use of a built-in platform component that detects one of an input current or input power consumed by the processor.

3. The method of claim 1, wherein the current amount of power dissipated by the processor is determined by performing the operations of:
   determining an amount of power dissipated by platform components exclusive of the processor during platform operations;
   measuring an input power consumed by the platform; and
   subtracting the determined amount of power dissipated by the platform components exclusive of the processor from the measured input power consumed by the platform to obtain the current amount of power dissipated by the processor.

4. The method of claim 3, wherein the platform comprises a computer that employs an external power supply and the input power consumed by the platform is measured by measuring a DC power input to the platform.

5. The method of claim 4, wherein the platform includes a chassis in which computer electronics including the processor are housed and all of the thermal solution validation operations are performed via software executing on the processor without using any extraneous sensors contained within the platform chassis.

6. The method of claim 5, wherein the thermal solution validation is performed without using any components that are extraneous from the platform.

7. The method of claim 1, wherein the determination to whether the processor is thermally overloaded is determined by performing the operations of:
   internally measuring the temperature of the processor; and
   verifying that the internally measured temperature of the processor does not exceed a maximum specified processor temperature.

8. The method of claim 1, wherein the determination to whether the processor is thermally overloaded is based on a determination to whether the processor is throttled while operating at the target power dissipation level.

9. The method of claim 1, wherein the determination to whether the processor is thermally overloaded is based on detecting a signal output by the processor that indicates the processor is thermally overloaded.

10. An automated method for validating a thermal solution for a computer platform, comprising:
   adjusting, through selective execution of thermal stress code on a platform processor, an amount of power dissipated by the processor to substantially match a target power dissipation level by performing the operations of:
      (a) executing an initial set of thermal stress code instructions;
      (b) determining a current amount of power dissipated by the processor;
      (c) comparing the current amount of power dissipated with the target power dissipation level;
      (d) selecting a new set of thermal stress code instructions to execute based on the result of operation (c), wherein execution of the new set of thermal stress code instructions increases the amount of power dissipated by the processor if the current amount of power dissipated is less than the target dissipation level or decreases the amount of power dissipated by the processor if the current amount of power dissipated is greater than the target dissipation level;
      (e) repeating operations (b)-(d) until a steady-state condition is reached, wherein the current amount of power dissipated by the processor substantially matches the target power dissipation level;
   calculating a thermal dissipation characterization value corresponding to the thermal solution while the processor is operating at the target power dissipation level; and
   comparing the calculated thermal dissipation characterization value with a specified thermal dissipation characterization parameter for the processor to determine whether to validate the thermal; and
   outputting a thermal solution validation test result based on the results of the comparison between the calculated thermal dissipation characterization value and the specified thermal dissipation characterization parameter.

11. The method of claim 10, wherein the current amount of power dissipated by the processor is determined through use of a built-in platform component that detects one of a input current or input power level consumed by the processor.

12. The method of claim 10, wherein the current amount of power dissipated by the processor is determined by performing the operations of:
   determining an amount of power dissipated by platform components exclusive of the processor during platform operations;
   measuring an input power consumed by the platform; and
   subtracting the determined amount of power dissipated by the platform components exclusive of the processor from the measured input power consumed by the platform to obtain the current amount of power dissipated by the processor.

13. The method of claim 12, wherein the platform comprises a computer that employs an external power supply and the input power consumed by the platform is measured by measuring a DC power input to the platform.

14. The method of claim 13, wherein the platform includes a chassis in which computer electronics including the processor are housed and all of the thermal solution validation operations are performed via software executing on the processor without using any extraneous sensors contained within the platform chassis.

15. The method of claim 14, wherein the validation of the thermal solution is performed without using any components that are extraneous from the platform.

16. The method of claim 10, wherein the calculated thermal dissipation characterization comprises a case-to-ambient thermal resistance that is calculated from the equation, $$\theta_{CA} = (T_C - T_A)/\text{Power dissipated by processor case to ambient}$$

wherein $T_C$ is the processor case temperature and $T_A$ is the ambient air temperature, further comprising,
   obtaining $T_A$;
   obtaining $T_C$;
   determining the current power dissipated by the processor; and
   calculating the case-to-ambient thermal resistance.

17. The method of claim 16, wherein $T_A$ is obtained by entry of the ambient temperature by test personnel via a software interface.

18. The method of claim 16, wherein $T_A$ is obtained by reading a temperature measurement device having a probe disposed in the ambient air.

19. The method of claim 16, wherein $T_C$ is obtained via a temperature sensing circuit built into the processor.

20. A machine-readable media having instructions stored thereon including thermal stress code, which when executed by a platform processor performs a validation of the platform's thermal solution by performing the operation of:
   adjusting, through selective execution of the thermal stress code by the processor, an amount of power dissipated by the processor to substantially match a target power dissipation level by performing the operations of:
      (a) executing an initial set of thermal stress code instructions;

(b) reading a value indicative of a current amount of power dissipated by the processor from one of a storage location or input/output port;

(c) comparing the current amount of power dissipated by the processor with the target power dissipation level;

(d) selecting; if necessary, a new set of thermal stress code instructions to execute based on the result of operation (c), wherein execution of the new set of thermal stress code instructions increases the amount of power dissipated by the processor if the current amount of power dissipated is less than the target dissipation level or decreases the amount of power dissipated by the processor if the current amount of power dissipated is greater than the target dissipation level;

(e) repeating operations (b)-(d) until a steady-state condition is reached, wherein the current amount of power dissipated by the processor substantially matches the target power dissipation level;

determining if the processor is thermally overloaded while operating at the target power dissipation level; and outputting a thermal solution validation test result, wherein the thermal solution is validated if the processor is not thermally overloaded while operating at the target power dissipation level.

21. The machine-readable media of claim 20, wherein execution of the instructions determines whether the processor is thermally overloaded by performing the operations of:

retrieving an internally measured temperature of the processor for a storage location; and verifying that the internally measured temperature of the processor does not exceed a maximum specified processor temperature.

22. The machine-readable media of claim 20, wherein execution of the instructions determines whether the processor is thermally overloaded by performing the operation of monitoring a processor register in which processor speed information is stored to determine whether the processor is throttled while operating at the target power dissipation level.

23. The machine-readable media of claim 20, wherein execution of the instructions determines whether the processor is thermally overloaded by performing the operation of monitoring a processor output that indicates the processor is thermally overloaded when asserted.

24. A machine-readable media having instructions stored thereon including thermal stress code, which when executed by a platform processor performs a validation of the platform's thermal solution by performing the operation of:

adjusting, through selective execution of the thermal stress code by the processor, an amount of power dissipated by the processor to substantially match a target power dissipation level based on an anticipated thermal stress load of the processor by performing the operations of:

(a) executing an initial set of thermal stress code instructions;

(b) determining a current amount of power dissipated by the processor;

(c) comparing the current amount of power dissipated with the target power dissipation level;

(d) selecting a new set of thermal stress code instructions to execute based on the result of operation (c), wherein execution of the new set of thermal stress code instructions increases the amount of power dissipated by the processor if the current amount of power dissipated is less than the target dissipation level or decreases the amount of power dissipated by the processor if the current amount of power dissipated is greater than the target dissipation level;

(e) repeating operations (b)-(d) until a steady-state condition is reached, wherein the current amount of power dissipated by the processor substantially matches the target power dissipation level;

retrieving thermal variables pertaining to a thermal environment for the platform and calculating a thermal dissipation characterization value based on those thermal variables while the processor is operating at the target power dissipation level;

comparing the calculated thermal dissipation characterization value with a specified thermal dissipation characterization parameter for the processor to determine whether to validate the thermal solution; and outputting a thermal solution validation test result based on the results of the comparison between the calculated thermal dissipation characterization value and the specified thermal dissipation characterization parameter.

25. The machine-readable media of claim 24, wherein the calculated thermal dissipation characterization value comprises a case-to-ambient thermal resistance that is calculated from the equation, $$\theta_{CA} = (T_C - T_A)/\text{Power dissipated by processor case to ambient}$$

wherein $T_C$ is the processor case temperature and $T_A$ is the ambient air temperature, and execution of the instructions further performs the operations of, obtaining $T_A$ from one of a value entered via a computer interface or reading a value produced by a temperature measurement device via a platform input/output (I/O) port;

reading one of a platform storage location or I/O port to obtain $T_C$;

reading a value indicative of a current amount of power dissipated by the processor from one of a platform storage location or I/O port; and calculating the case-to-ambient thermal resistance.

26. The machine-readable media of claim 24, wherein the processor provides a thermal management mode, and execution of the instructions generates a command to enable the thermal management mode.

27. A machine-readable media having instructions stored thereon including thermal stress code, which when executed by a platform processor performs a validation of the platform's thermal solution by performing the operation of:

adjusting, through selective execution of the thermal stress code by the processor, an amount of power dissipated by the processor to substantially match a target power dissipation level by performing the operations of:

(a) executing an initial set of thermal stress code instructions;

(b) reading a value indicative of a current amount of power dissipated by the processor from one of a storage location or input/output port;

(c) comparing the current amount of power dissipated by the processor with the target power dissipation level;

(d) selecting, if necessary, a new set of thermal stress code instructions to execute based on the result of operation (c), wherein execution of the new set of thermal stress code instructions increases the amount of power dissipated by the processor if the current amount of power dissipated is less than the target dissipation level or decreases the amount of power dissipated by the processor if the current amount of power dissipated is greater than the target dissipation level;

(e) repeating operations (b)-(d) until a steady-state condition is reached, wherein the current amount of power dissipated by the processor substantially matches the target power dissipation level;

retrieving thermal variables pertaining to a thermal environment for the platform and calculating a thermal dissipation characterization value based on those thermal variables while the processor is operating at the target power dissipation level;

comparing the calculated thermal dissipation characterization value with a specified thermal dissipation characterization parameter for the processor to determine whether to validate the thermal solution; and outputting a thermal solution validation test result based on the results of the comparison between the calculated thermal dissipation characterization value and the specified thermal dissipation characterization parameter.

* * * * *